(12) United States Patent
Vasseur et al.

(10) Patent No.: US 10,440,577 B1
(45) Date of Patent: Oct. 8, 2019

(54) HARD/SOFT FINITE STATE MACHINE (FSM) RESETTING APPROACH FOR CAPTURING NETWORK TELEMETRY TO IMPROVE DEVICE CLASSIFICATION

(71) Applicant: Cisco Technology, Inc., San Jose, CA (US)

(72) Inventors: Jean-Philippe Vasseur, Saint Martin d'uriage (FR); Pierre-André Savalle, Rueil-Malmaison (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/183,940

(22) Filed: Nov. 8, 2018

(51) Int. Cl.
*H04W 12/08* (2009.01)
*H04W 4/70* (2018.01)
(Continued)

(52) U.S. Cl.
CPC .......... *H04W 12/08* (2013.01); *G05B 19/045* (2013.01); *G06F 9/4498* (2018.02); *G06N 20/00* (2019.01);
(Continued)

(58) Field of Classification Search
CPC ..... H04W 12/08; H04W 64/00; H04W 48/02; H04W 24/08; H04W 8/24; H04W 8/005; H04W 4/70; G06N 20/00; H04L 63/20; H04L 63/10; G06F 9/4498; G05B 19/045; G05B 2219/23289
See application file for complete search history.

(56) References Cited

U.S. PATENT DOCUMENTS 10,089,582 B2 * 10/2018 Fawaz .................... G06N 5/043
2016/0226732 A1    8/2016 Kim et al.
(Continued)

FOREIGN PATENT DOCUMENTS

WO    WO 2018/160136 A1 *  9/2018 ............. H04L 12/24

OTHER PUBLICATIONS

Chiba, et al., "Dynamic Authorization Extensions to Remote Authentication Dial in User Service (RADIUS)", Request for Comments: 3576, Network Working Group, 30 pages, Jul. 2003, The Internet Society.
(Continued)

*Primary Examiner* — Brandon J Miller
(74) *Attorney, Agent, or Firm* — Behmke Innovation Group LLC; James Behmke; Stephen D. LeBarron

(57) ABSTRACT

In one embodiment, a device classification service receives a first set of telemetry data captured by one or more networking devices in a network regarding traffic associated with an endpoint device in the network. The service classifies the endpoint device as being of an unknown device type, by applying a machine learning-based classifier to the first set of telemetry data. The service instructs the one or more networking devices in the network to reset a finite state machine (FSM) of the traffic associated with the endpoint device. The device classification service receives a second set of telemetry data regarding traffic associated with the endpoint device and captured after reset of the FSM. The service reclassifies the endpoint device as being of a particular device type, by applying the machine learning-based classifier to the second set of telemetry data.

20 Claims, 9 Drawing Sheets

(51) Int. Cl.

| | | |
|---|---|---|
| | *H04W 8/00* | (2009.01) |
| | *H04W 8/24* | (2009.01) |
| | *H04W 24/08* | (2009.01) |
| | *H04W 48/02* | (2009.01) |
| | *G05B 19/045* | (2006.01) |
| | *G06F 9/448* | (2018.01) |
| | *H04L 29/06* | (2006.01) |
| | *H04W 64/00* | (2009.01) |
| | *G06N 20/00* | (2019.01) |

(52) U.S. Cl.
CPC .............. *H04L 63/10* (2013.01); *H04L 63/20* (2013.01); *H04W 4/70* (2018.02); *H04W 8/005* (2013.01); *H04W 8/24* (2013.01); *H04W 24/08* (2013.01); *H04W 48/02* (2013.01); *H04W 64/00* (2013.01); *G05B 2219/23289* (2013.01)

(56) References Cited

U.S. PATENT DOCUMENTS

| | | |
|---|---|---|
| 2017/0295522 A1 | 10/2017 | Shalev et al. |
| 2018/0109551 A1 | 4/2018 | Wetterwald et al. |
| 2018/0278629 A1* | 9/2018 | McGrew ............. H04L 63/1408 |
| 2018/0375887 A1* | 12/2018 | Dezent ................ H04L 63/1425 |

OTHER PUBLICATIONS

Floyd, S., "Inappropriate TCP Resets Considered Harmful", Request for Comments: 3360, Network Working Group, 19 pages, Aug. 2002, The Internet Society.

* cited by examiner

US 10,440,577 B1

HARD/SOFT FINITE STATE MACHINE (FSM) RESETTING APPROACH FOR CAPTURING NETWORK TELEMETRY TO IMPROVE DEVICE CLASSIFICATION

TECHNICAL FIELD

The present disclosure relates generally to computer networks, and, more particularly, to a hard/soft finite state machine (FSM) resetting approach for capturing network telemetry to improve device classification.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
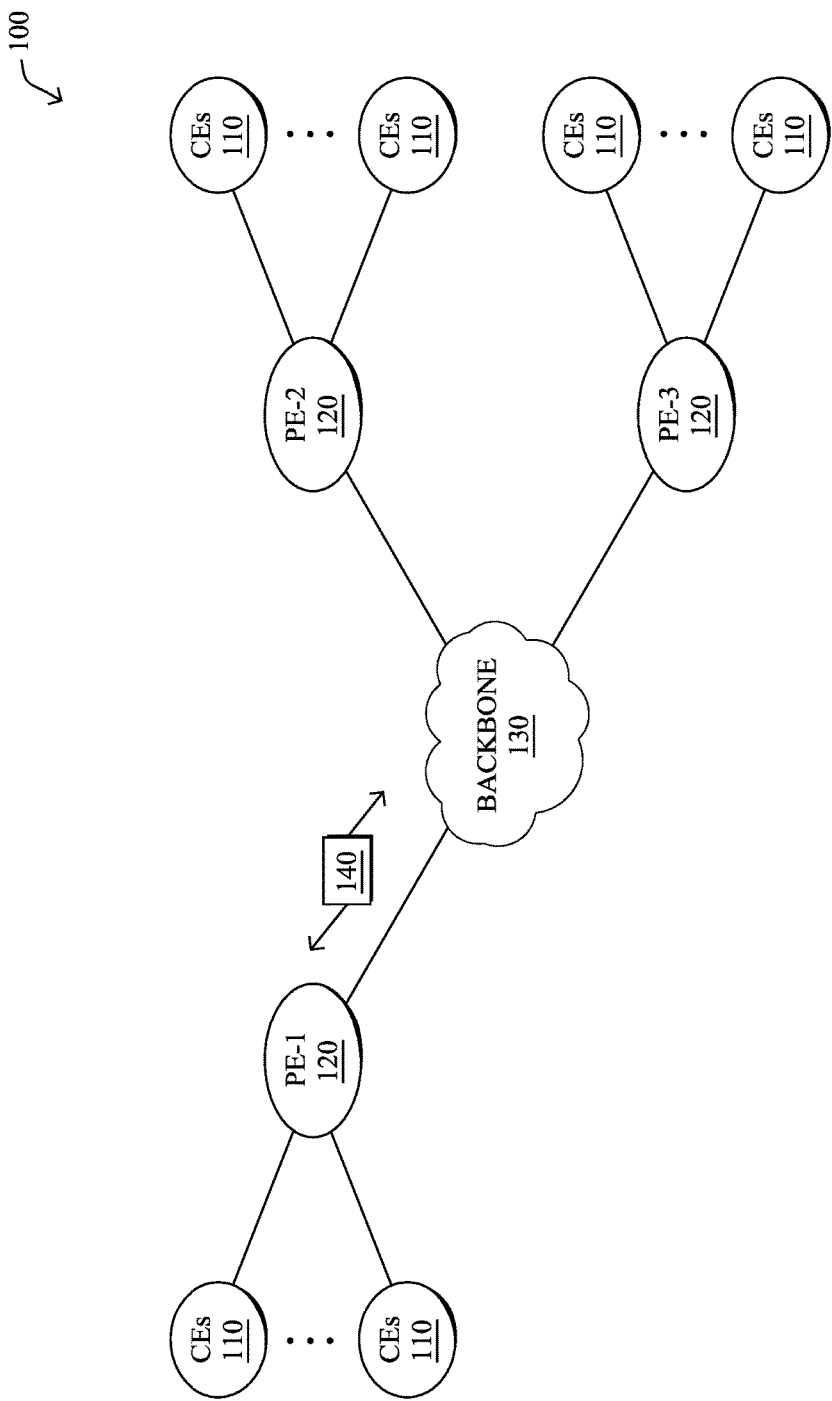
FIGS. 1A-1B illustrate an example communication network.

According to one or more embodiments of the disclosure, a device classification service receives a first set of telemetry data captured by one or more networking devices in a network regarding traffic associated with an endpoint device in the network. The service classifies the endpoint device as being of an unknown device type, by applying a machine learning-based classifier to the first set of telemetry data. The service instructs the one or more networking devices in the network to reset a finite state machine (FSM) of the traffic associated with the endpoint device. The device classification service receives a second set of telemetry data regarding traffic associated with the endpoint device and captured after reset of the FSM. The service reclassifies the endpoint device as being of a particular device type, by applying the machine learning-based classifier to the second set of telemetry data.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
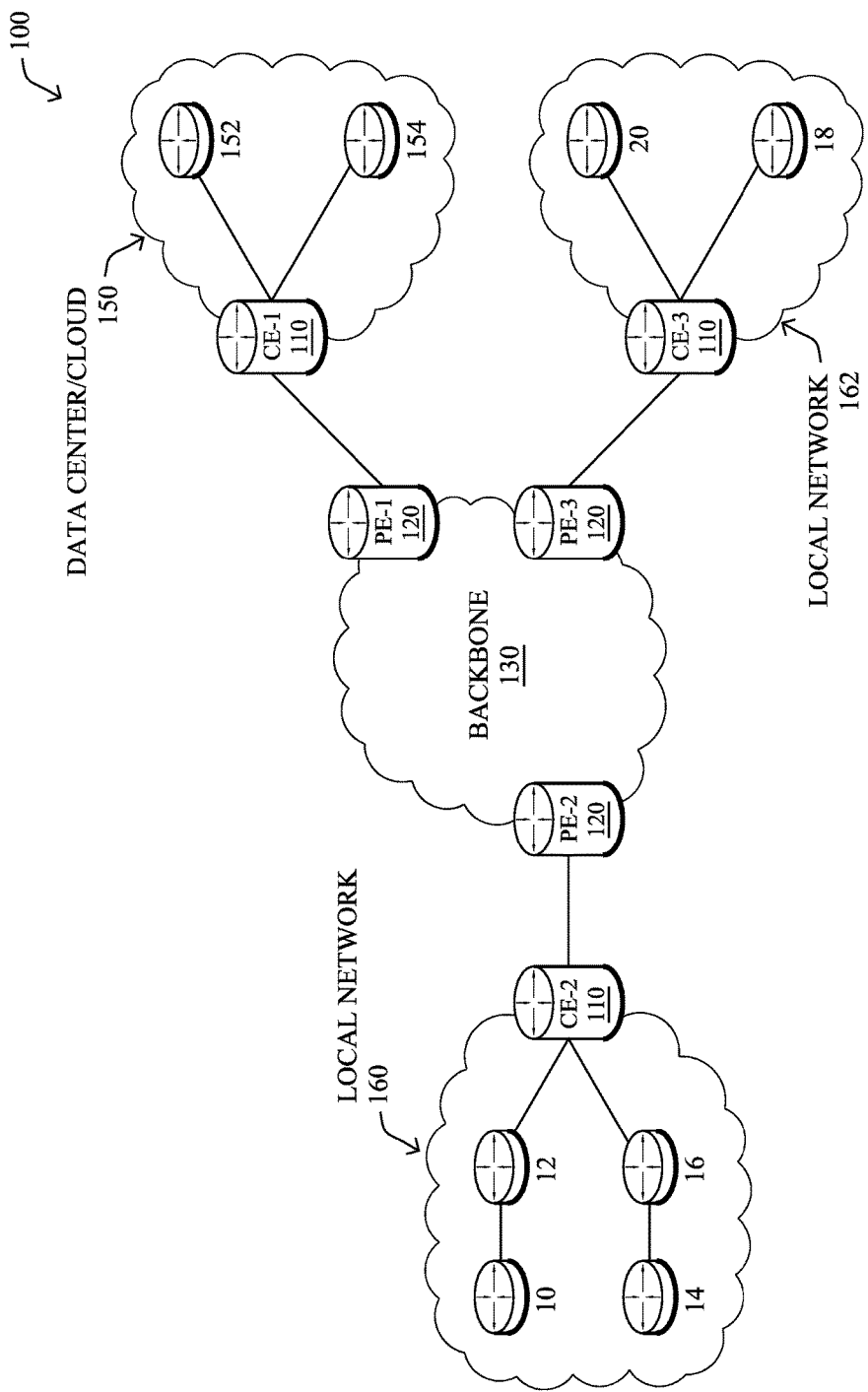

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
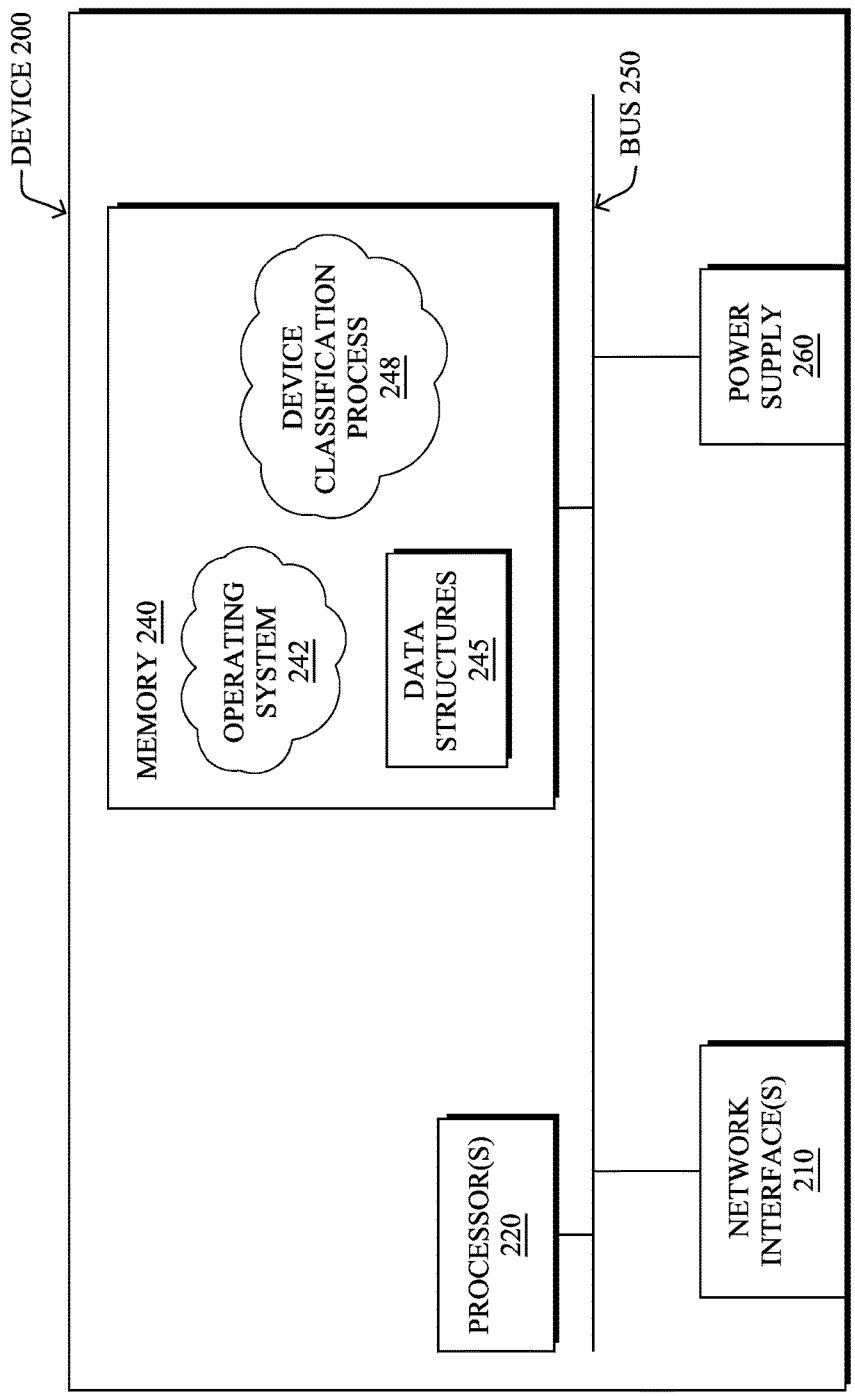
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154

(e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
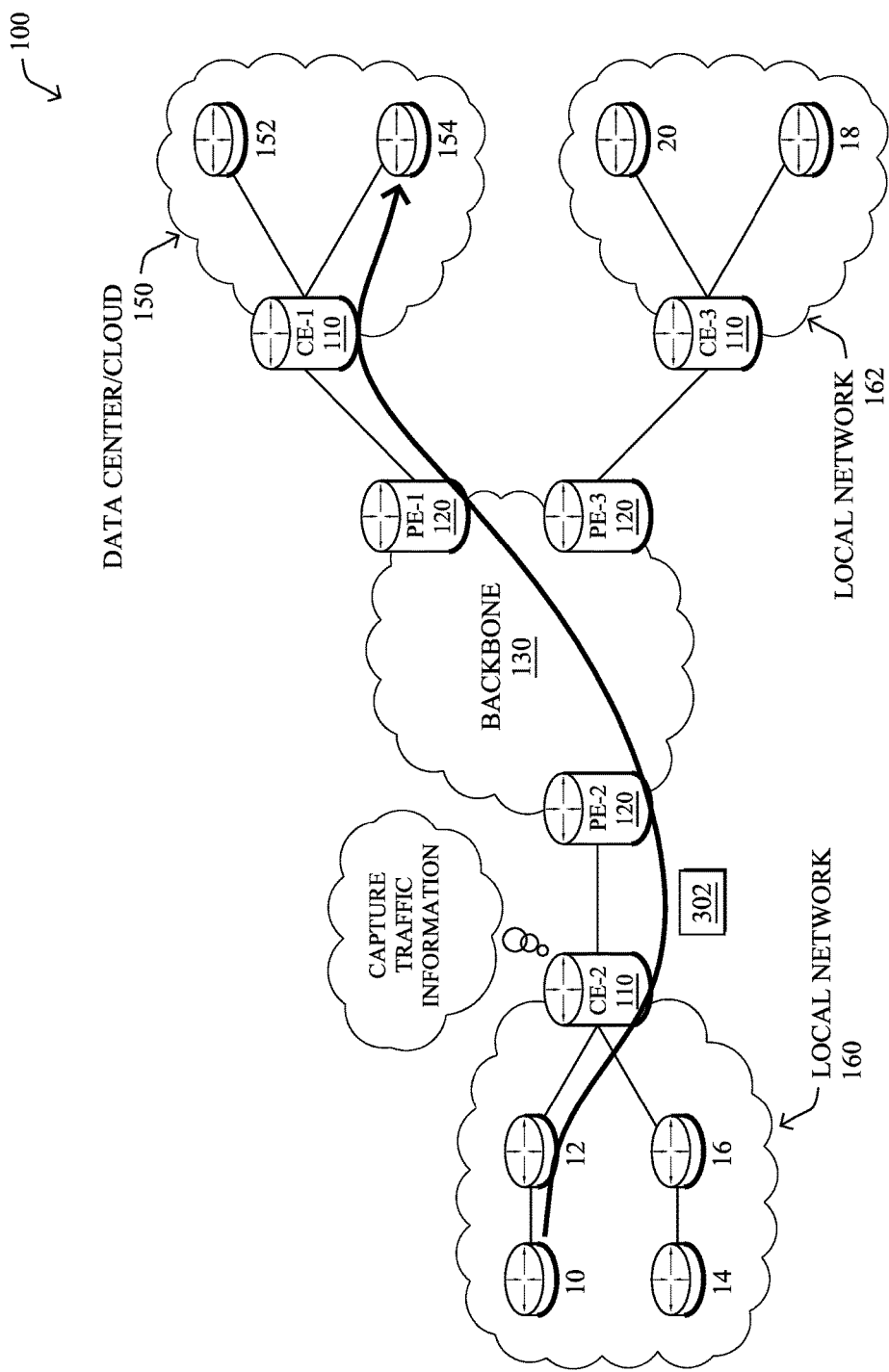
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, a number of data sources can be used for purposes of classifying the device type of an endpoint in a network. For example, a device classifier may take as input Netflow or IPFIX data (e.g., the type of applications being used, source/destination ports, flow duration information, etc.), information obtained from probing (e.g., DHCP option, HTTP information, authentication data, etc.), MAC addresses, OUI field information, and the like. In the case of a machine learning-based device classifier, such information can be labeled for devices having known types, to train the classifier using supervised learning.

Preliminary testing has revealed that the traffic captured when the endpoint device first connects to the network is a strong indicator of the device type. For example, the packets exchanged during the bootstrapping process at all layers (e.g. WiFi, Ethernet, 802.15.4, but also TCP/SCTP, and at the application layers) can be especially important to recognizing the type of the device. Unfortunately, the time window during which those packets are exchanged is usually very short, meaning that capture of the telemetry concerning this traffic (e.g., via packet capture, etc.) is not guaranteed in the network. When missing, this may cause the device classifier to be unable to classify the endpoint device, resulting in a device type label of 'UNKNOWN.'

Hard/Soft FSM Resetting Approach for Capturing Network Telemetry to Improve Device Classification The techniques herein introduce a set of mechanisms to trigger a traffic finite state machine (FSM) reset of an endpoint device labeled as 'UNKNOWN' by a device classification service. More specifically, when the device classification service classifies an endpoint device as 'UNKNOWN,' it may trigger an FSM reset at a given layer X, allowing for the capture of telemetry data for the initial packets at that layer. In some aspects, the service may make a priority risk assessment, to determine the appropriate type of action for the unknown endpoint device. For example, the service may analyze the existing protocols in use by the endpoint device and trigger an FSM reset according to the degree of allowable disruptiveness, the type of packets useful to enhance the classification task, etc. In turn, the service may signal to the networking device(s) to trigger a soft FSM reset (e.g., by spoofing in-band control plane packets, etc.) or a hard FSM reset, which may be more disruptive.

Specifically, according to one or more embodiments of the disclosure as described in detail below, a device classification service receives a first set of telemetry data captured by one or more networking devices in a network regarding traffic associated with an endpoint device in the network. The service classifies the endpoint device as being of an unknown device type, by applying a machine learning-based classifier to the first set of telemetry data. The service instructs the one or more networking devices in the network to reset a finite state machine (FSM) of the traffic associated with the endpoint device. The device classification service receives a second set of telemetry data regarding traffic associated with the endpoint device and captured after reset of the FSM. The service reclassifies the endpoint device as being of a particular device type, by applying the machine learning-based classifier to the second set of telemetry data.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Operationally, the techniques herein introduce an approach whereby a device classification service may inspect the protocols in use by an endpoint device and select a network layer at which to reset the FSM of the traffic associated with the endpoint device. Depending on the situation, the nature of the FSM reset can range from a soft reset to a hard reset. In addition, the location of the agent performing the reset can be determined dynamically and signaled to cause the FSM reset via spoofed control plane traffic with the endpoint device. By doing so, the network can capture the initial packets exchanged by the endpoint device during protocol (re)initialization, which can improve the classification of the endpoint device by the device classification service.

Figure 4:
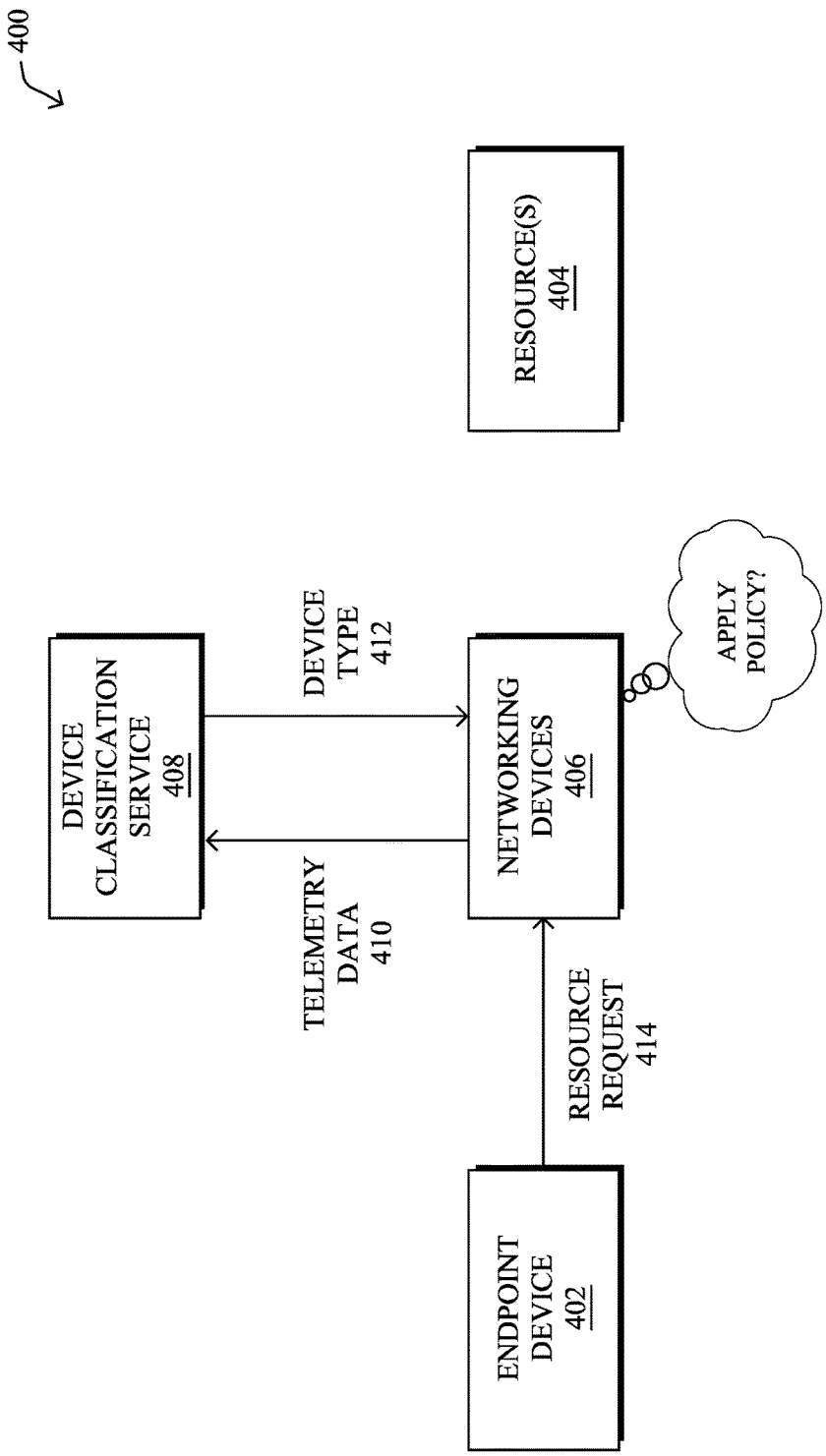
FIG. 4 illustrates an example of a device classification service in a network.

Operationally, FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

One key aspect of the techniques herein relates to the specification of a policy for endpoint devices labeled as being of an 'UNKNOWN' device type. In some cases, if device type 412 of endpoint device 402 is 'UNKNOWN,' networking devices 406 may either reject traffic from endpoint device 402 or redirect the traffic into a specific VPN (e.g., a specific VLAN, using a Security Group Tag (SGT), MPLS VPN, etc.). This allows for the elaboration of more sophisticated policies according to the device type using, for example, a pre-assessed risk level according to various parameters (e.g., type of traffic observed on the device, DNS requests, OUI, etc.). For example, endpoint device 402 may be considered to be of a low risk, despite being labeled as 'UNKNOWN' by service 408, if endpoint device 402 sends traffic for a known application at a low data rate to a known destination and its OUI allows for the determination of its chipset vendor. In contrast, endpoint device 402 may be of a higher risk if service 408 labels endpoint device 402 of being an 'UNKNOWN' type and device 402 sends fast rotating DNS requests for unknown resources.

Such a pre-assessed risk level may be used by one or more of networking devices 406 to decide whether endpoint device 402 should be assigned to a given VPN, potentially for a given period of time T, and with the traffic potentially redirected to a sandboxing environment for further observation and analysis. Once the time T expires, networking devices 406 may simply drop the traffic associated with endpoint device 402, thanks to dynamic access lists. Such a policy may also, in various embodiments, trigger an FSM reset so that further information can be gathered about endpoint device 402, as detailed below.

Figure 5A:
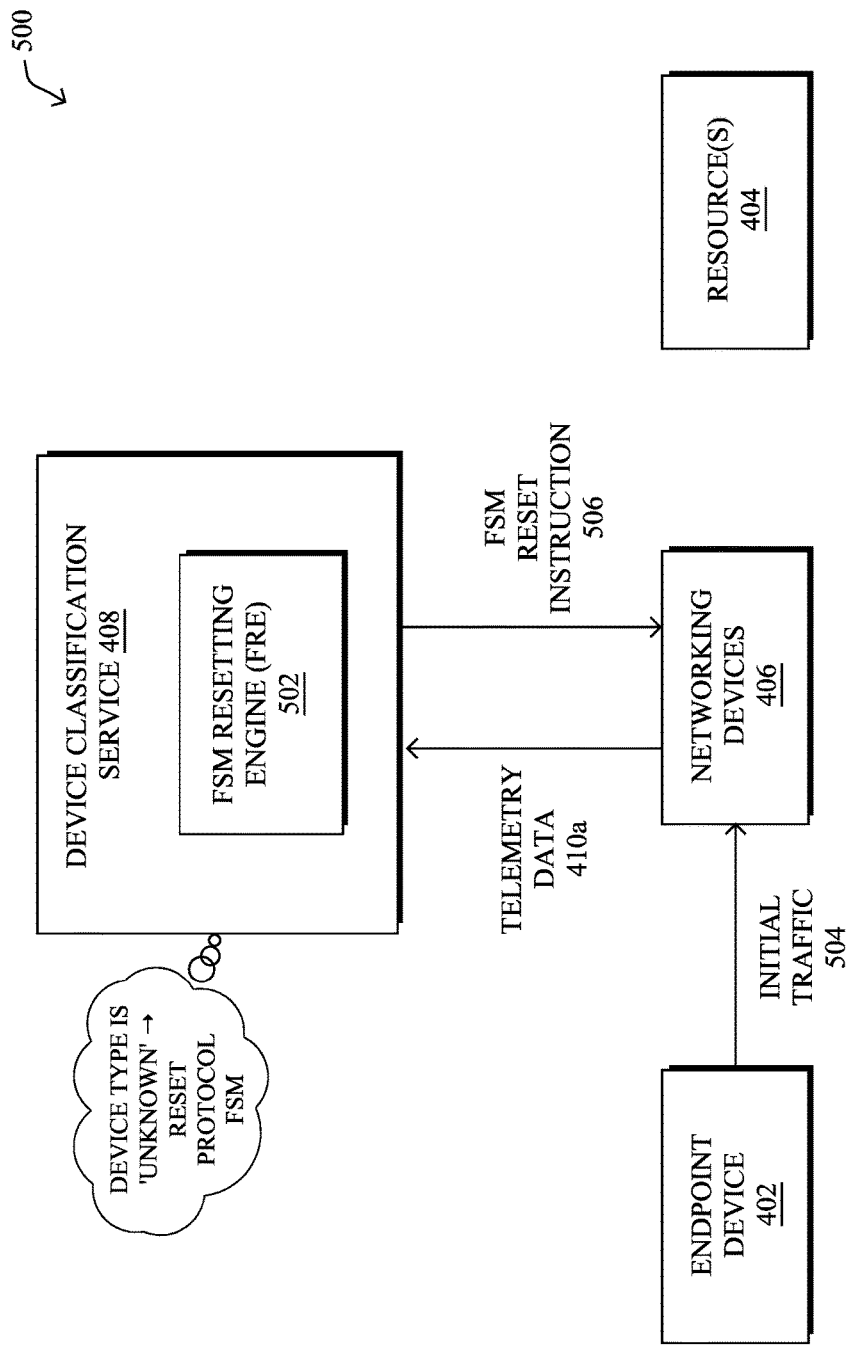
FIGS. 5A-5C illustrate an example of resetting the finite state machine (FSM) of traffic associated with an endpoint device to be classified.
Figure 5B:
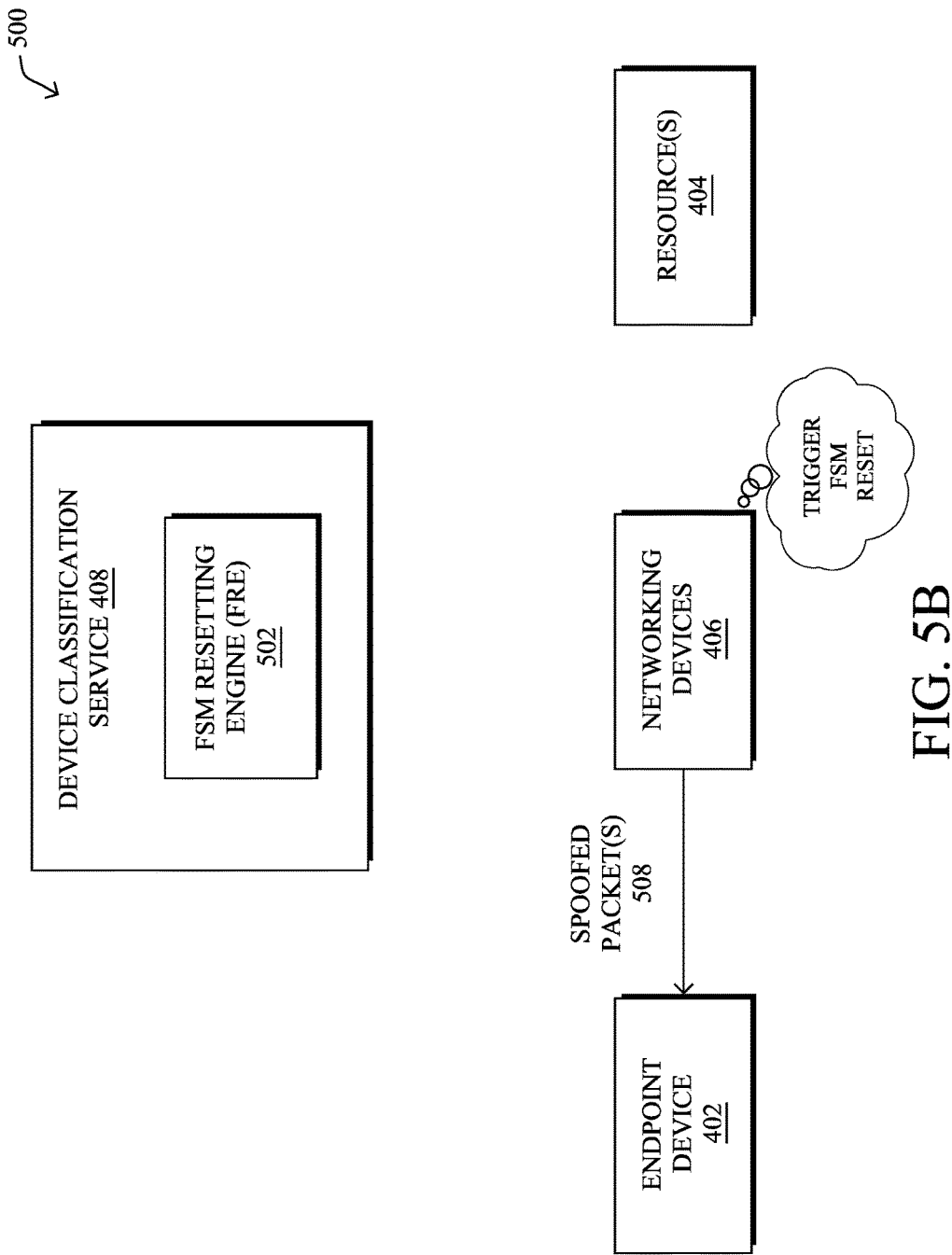
Figure 5C:
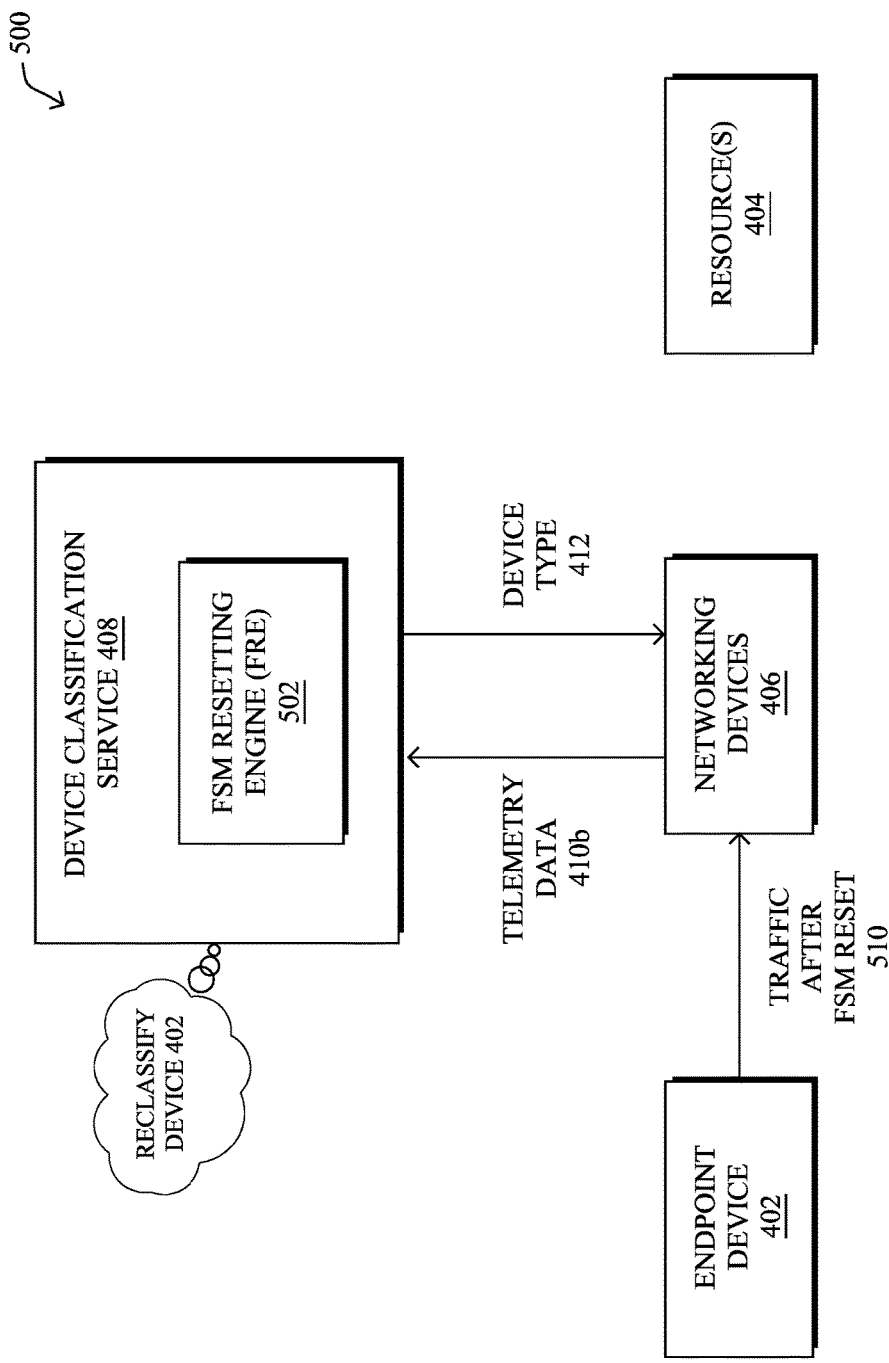

FIGS. 5A-5C illustrate an example 500 of resetting the finite state machine (FSM) of traffic associated with an endpoint device to be classified, according to various embodiments. Continuing the example of network 400 in FIG. 4, FIG. 5A illustrates the capture of telemetry data 410*a* regarding the initial traffic of endpoint device 402. Preliminary testing has shown that the initial packets exchanged by endpoint device 402 for the various protocols in use by endpoint device 402 (e.g., TCP, WiFi, 802.15.4, Ethernet, application layer protocols, etc.) tend to be the most indicative of the type of the endpoint device.

According to various embodiments, the techniques herein introduce a FSM resetting engine (FRE) 502 responsible for triggering a soft or hard reset of the protocol FSM associated with the traffic of endpoint device 402. FRE 502 may be implemented as part of device classification service 408 or, alternatively, on one or more of networking devices 406 or as a separate service in communication with service 408 and networking device(s) 408. In particular, when device classification service 408 determines that endpoint device 402 is of an 'UNKNOWN' type, FRE 502 may inspect the protocol(s) being used by endpoint device 402 and select the FSM to be reset, so as to collect any information missing from telemetry data 410a. In turn, FRE 502 may send a FSM reset instruction 506 to one or more networking devices 406 to reset the FSM, either as a 'hard' or 'soft' reset, depending on the risk level of endpoint device 402.

In some embodiments, FRE 502 may select the layer of choice for FSM restart based in part on the importance of the missing feature, from a machine learning perspective. Notably, certain features in the set of input data to a machine learning classifier may have more of an effect on the resulting classification than others. For example, consider a classifier that makes use of the first packet exchanged by devices when joining a WiFi network, the first packets exchanged by the TCP layer, as well as the packets for certain applications. By considering the feature importance of the classifier, FRE 502 may determine that resetting the FSM at layer X is likely to be sufficient while being less disruptive than the FSM at layer X-1. In yet another embodiment, if allowed by policy, FRE 502 may determine the time at which the reset is triggered according to the activity of endpoint device 402 (e.g., during nights, etc.).

Once FRE 502 decides to trigger a FSM reset at layer X by sending an FSM reset instruction 506, FRE 502 may also determine the specific one or more networking devices 406 that are to receive instruction 506. For example, FRE 502 may inspect the routing topology of networking devices 406, to select a networking device 406 that is locally connected to endpoint device 402 as the recipient of reset instruction 506 (e.g., an AP if device 402 is a WiFi client, a switch if device 402 is on Ethernet, etc.). Note that if the FSM operates at Layer 2, the networking device 406 must be locally connected to endpoint device 402. In another embodiment, FRE 502 may also select the recipient(s) of FSM reset instruction 506 based in part on the other 'UNKNOWN' endpoint devices in the network and their respective locations.

In its simplest form, FSM reset instruction 506 may cause one or more of networking devices 406 to perform a 'hard' FSM reset. For example, FSM reset instruction 506 may cause the networking device(s) 406 connected to endpoint device 402 to black-hole the traffic associated with endpoint device 402 (e.g., by dropping the traffic) on any and all layers of communication. In turn, the networking device(s) 406 may wait for the protocol control plane traffic to initiate a new FSM, allowing networking devices(s) 406 to capture telemetry data regarding the traffic of endpoint device 402 after the FSM reset.

By way of example of a hard FSM reset, consider the case of the WiFi protocol. In the absence of an ACK frame, and after some time governed by the timer configuration, endpoint device 402 will either roam to another AP in networking devices 406, in which case the FSM will restart and new telemetry can be captured or device 402 can restart the authentication cycle with its current AP, allowing networking devices 406 to capture telemetry regarding these initial packets for classification by device classification service 408. Note, however, that this approach is disruptive, as the traffic of endpoint 402 is black-holed.

In further embodiments, FRE 502 may instead take a 'soft' approach to FSM resetting, such as based on the threat/risk that endpoint device 402 poses. In general, the soft reset approach entails sending one or more spoofed packets to endpoint device 402 for the protocol undergoing the FSM reset. For example, as shown in FIG. 5B, assume that FRE 502 has instructed one or more of networking devices 406 to trigger an FSM for a specific protocol used by endpoint device 402. In such a case, the networking device 406 may send one or more spoofed packet(s) 508 to endpoint device 402, to 'trick' endpoint device 402 into restarting the protocol FSM.

Various examples of soft FSM resets exist and FRE 502 may select the appropriate protocol FSM to be reset based on which data is missing from the original set of telemetry data regarding the traffic of endpoint device 402. For example, in the case of an application FSM, FSM reset instruction 506 sent to one or more of networking devices 406 may cause the device(s) to send spoofed application packets to endpoint device 402 that triggers a reset of the application FSM, allowing for the capture of telemetry regarding these initial packets. In another example, one of networking devices 406, such as an AP or switch, may reset the TCP FSM by sending a spoofed packet to endpoint device 402 that has the RST flag set. Note that TCP reset injection, also sometimes referred to as a forged TCP reset, is considered to be a legitimate, but harmful, action. In a further example, the Stream Control Transmission Protocol (SCTP) allows for forcing an association restart.

Other control plane packets signaling may be used by protocol such as bidirectional forwarding detection (BFD) to restart a session (e.g., by using spoofed packets or make use of a command line interface), which will also trigger a FSM restart and initial packets to be sent by endpoint device 402. Some protocols may allow for even smoother approaches. For example, networking devices 406 may use 802.11v signaling to suggest that endpoint device 402 roam to another AP using "action frame" ("BSS transition"). Although less disruptive than the hard reset approach above, this would lead to re-initiating the FSM at the WiFi layer, while not resetting the transport layer (TCP) or even the application layer (since timers at higher layers are usually set to long values).

In yet another approach, networking devices 406 may spoof the MAC layer such that a MAC frame may no longer be acknowledged, leading to a MAC layer reset of endpoint device 402. This can also lead to a complete reset of the stack (e.g., transport and application layer) of the traffic of endpoint device 402. In another example, a user of endpoint device 402 may be disconnected from dynamically changed authorization using change of authorization (CoA) messages, which cause a user session to be terminated.

In other words, a key functionality of FRE 502 is to specify a list of actions to be performed by one or more of networking devices 406 connected to endpoint device 402, when device 402 is classified as being of an 'UNKNOWN' device type. These actions can range from smooth to disruptive and can also occur at different networking layers, to restart a protocol FSM. In doing so, as shown in FIG. 5C, networking devices 406 can capture telemetry data 410b regarding the traffic 510 that results after the FSM reset and report it to device classification service 408. In many cases, this additional telemetry data 410b is enough to shift the classification of endpoint device 402 from 'UNKNOWN' to being a particular device type 412. This allows networking devices 406 to apply an appropriate network policy to the traffic of endpoint device 402.

In some cases, FRE 502 can also control which telemetry data 410b is captured and reported back by networking devices 406 (e.g., via FSM reset instruction 506). For example, once the FSM reset has taken place, the networking device(s) 406 involved may only capture packets that match a filter specified by FRE 502 (e.g., capture all packets, capture only TCP packets, capture only packets from application A, etc.) for a given duration. In one embodiment, FRE 502 may specify this duration based on the amount of historical data for that traffic characteristic needed by the device type classifier of device classification service 408. By doing so, the amount of data captured is likely to be very lightweight and highly scalable.

Figure 6:
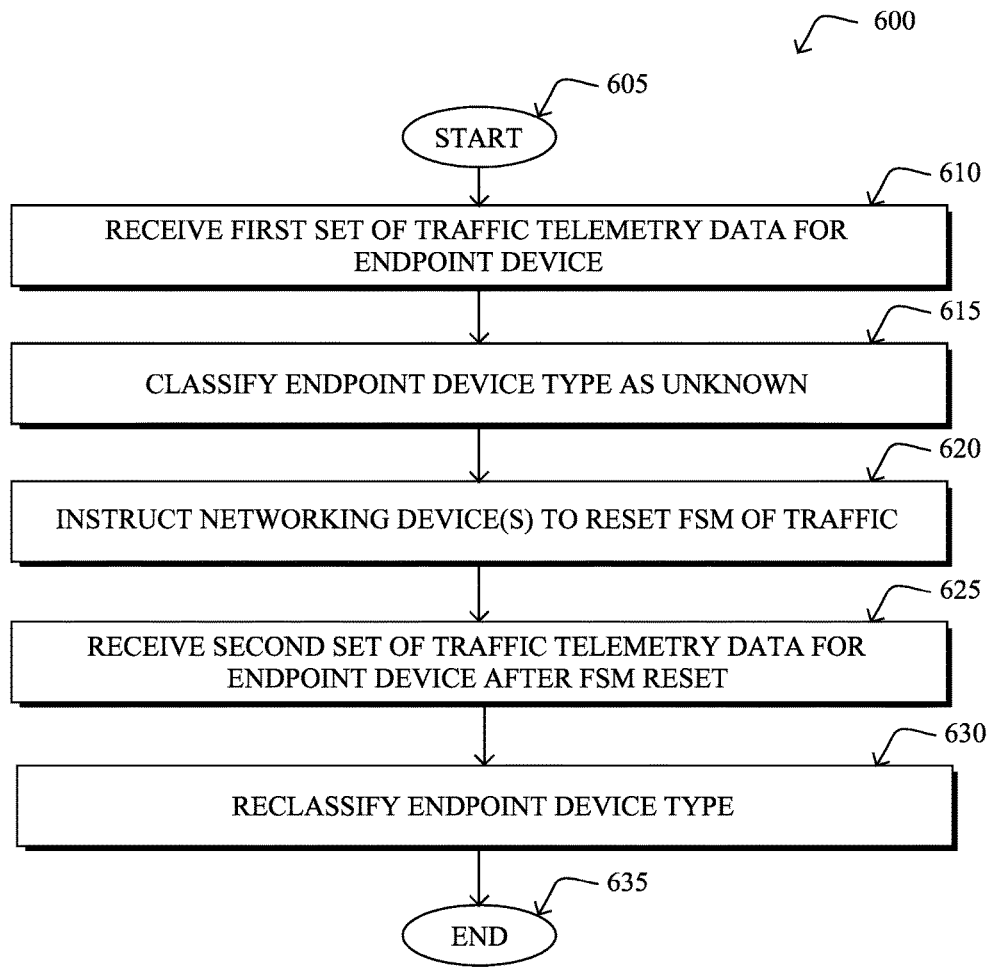
FIG. 6 illustrates an example simplified procedure for resetting the FSM of traffic associated with an endpoint device to be classified.

FIG. 6 illustrates an example simplified procedure for resetting the FSM of traffic associated with an endpoint device to be classified, in accordance with one or more embodiments described herein. For example, a non-generic, specifically configured device (e.g., device 200) may perform procedure 600 by executing stored instructions (e.g., process 248), to provide a device classification service to a network. The procedure 600 may start at step 605, and continues to step 610, where, as described in greater detail above, the device classification service may receive a first set of telemetry data captured by one or more networking devices in a network regarding traffic associated with an endpoint device in the network.

At step 615, as detailed above, the device classification service may classify the endpoint device as being of an unknown device type, by applying a machine learning-based classifier to the first set of telemetry data. As would be appreciated, such a classifier may be trained on any number of characteristics/features that can be captured in the network as telemetry data and labeled with the device types of their corresponding endpoints. For example, the classifier may be trained to discern between devices of different manufacturers, makes, models, functions, or the like. When the classifier is unable to classify the endpoint device with a particular device type (e.g., 'Apple iPhone XR,' 'Samsung Galaxy,' etc.), the classifier may apply a label to the device indicative of the device being of an 'UNKNOWN' type.

At step 620, the device classification service may instruct the one or more networking devices in the network to reset a finite state machine (FSM) of the traffic associated with the endpoint device, as described in greater detail above. Such an FSM may be associated with a particular protocol or application and may exist on any of the various network layers (e.g., Layer 2, Layer 3, etc.). Example FSMs that can be reset may include, but are not limited to, a WiFi FSM, TCP FSM, SCTP FSM, MAC layer FSM, application-specific FSM, and the like.

In some embodiments, the service may select whether to trigger the FSM reset in a hard manner (e.g., by instructing the networking device to drop traffic associated with the endpoint). In other embodiments, the service may instruct the networking device(s) to perform a soft FSM reset, such as by sending one or more spoofed packets to the endpoint for the protocol or application of the FSM. For example, such a spoofed packet may essentially trick the endpoint device into restarting the FSM under scrutiny. Selection between a soft or hard reset can be based on the risk level of the endpoint device in question. In addition, the service may also select the networking device(s) to receive the reset instruction based on their location in the network (e.g., by selecting the AP or switch to which the endpoint device is attached) and/or to coordinate FSM resets among a number of other endpoints of unknown type, as well.

At step 625, as detailed above, the device classification service may receive a second set of telemetry data regarding traffic associated with the endpoint device and captured after reset of the FSM. In general, the second set of telemetry data may include information captured from the initial packets of the endpoint device associated with the restarted FSM. For example, the telemetry data may include data captured when the endpoint device reattaches to the network, etc. In some embodiments, the instruction of step 620 may also indicate a telemetry filter, so as to cause the capture of only certain types of telemetry of interest (e.g., for the protocol FSM that was restarted).

At step 630, the device classification service may reclassify the endpoint device as being of a particular device type, by applying the machine learning-based classifier to the second set of telemetry data, as described in greater detail above. In some embodiments, the service may provide an indication of the device type from the reclassification to one or more networking devices in the network, to apply an appropriate network policy to the endpoint device based on its device type. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, address the technical problem associated with using initial packet telemetry data as input to a machine learning-based device classifier. In particular, the transient nature of the initial packets generated when an endpoint device starts a protocol FSM (e.g., TCP, WiFi, etc.) may lead to situations in which telemetry data for these packets is not captured. However, such information may be very influential on the device type classification of the endpoint device and absence of this information can lead to misclassification of the endpoint device as 'UNKNOWN.' In various aspects, the techniques herein introduce both hard and soft FSM resetting approaches that allow for the capture of telemetry data after FSM reset. This additional information can be used to improve the classification of the endpoint device, such as reclassifying the endpoint device from being 'UNKNOWN' to being of a particular device type.

While there have been shown and described illustrative embodiments that provide for FSM resetting approaches to improve device type classifications, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, such as WiFi, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device classification service, a first set of telemetry data captured by one or more networking devices in a network regarding traffic associated with an endpoint device in the network;
   classifying, by the device classification service, the endpoint device as being of an unknown device type, by applying a machine learning-based classifier to the first set of telemetry data;
   instructing, by the device classification service, the one or more networking devices in the network to reset a finite state machine (FSM) of the traffic associated with the endpoint device;
   receiving, at the device classification service, a second set of telemetry data regarding traffic associated with the endpoint device and captured after reset of the FSM; and
   reclassifying, by the device classification service, the endpoint device as being of a particular device type, by applying the machine learning-based classifier to the second set of telemetry data.

2. The method as in claim 1, further comprising:
   providing, by the device classification service, an indication of the reclassification of the endpoint device to a particular one of the networking devices, wherein the particular networking device applies a network policy to traffic of the endpoint device based on the provided indication.

3. The method as in claim 1, wherein instructing the one or more networking devices in the network to reset a FSM of the traffic associated with the endpoint device comprises:
   assigning a risk level to the endpoint device based on the first set of telemetry data; and
   selecting between a hard FSM reset approach and a soft FSM reset approach, based on the risk level of the endpoint device.

4. The method as in claim 3, wherein the service selects the hard FSM reset approach, and wherein instructing the one or more networking devices in the network to reset a FSM of the traffic associated with the endpoint device comprises:
   instructing the one or more networking devices to drop the traffic associated with the endpoint device.

5. The method as in claim 1, further comprising:
   identifying, by the device classification service, telemetry data associated with a particular protocol that is missing from the first set of telemetry data, wherein the reset FSM is an FSM for the particular protocol.

6. The method as in claim 5, wherein instructing the one or more networking devices in the network to reset a FSM of the traffic associated with the endpoint device comprises:
   instructing the one or more networking devices to send a spoofed control packet for the particular protocol to the endpoint device that causes the reset of the FSM for the particular protocol.

7. The method as in claim 5, wherein the particular protocol comprises at least one of: WiFi, Transmission Control Protocol (TCP), or Stream Control Transmission Protocol (SCTP).

8. The method as in claim 1, further comprising:
   identifying, by the device classification service, telemetry data associated with a particular application that is missing from the first set of telemetry data, wherein the reset FSM is an FSM for the particular application.

9. The method as in claim 1, wherein instructing the one or more networking devices in the network to reset a FSM of the traffic associated with the endpoint device comprises:
   selecting the one or more networking devices based on their location relative to the endpoint device according to a topology of the network.

10. The method as in claim 1, wherein the one or more networking devices cause the endpoint device to roam to a different wireless access point or re-authenticate with the network.

11. An apparatus, comprising:
    one or more network interfaces to communicate with a network;
    a processor coupled to the network interfaces and configured to execute one or more processes; and
    a memory configured to store a process executable by the processor, the process when executed configured to:
      receive a first set of telemetry data captured by one or more networking devices in a network regarding traffic associated with an endpoint device in the network;
      classify the endpoint device as being of an unknown device type, by applying a machine learning-based classifier to the first set of telemetry data;
      instruct the one or more networking devices in the network to reset a finite state machine (FSM) of the traffic associated with the endpoint device;
      receive a second set of telemetry data regarding traffic associated with the endpoint device and captured after reset of the FSM; and
      reclassify endpoint device as being of a particular device type, by applying the machine learning-based classifier to the second set of telemetry data.

12. The apparatus as in claim 11, wherein the process when executed is further configured to:
    provide an indication of the reclassification of the endpoint device to a particular one of the networking devices, wherein the particular networking device applies a network policy to traffic of the endpoint device based on the provided indication.

13. The apparatus as in claim 11, wherein the apparatus instructs the one or more networking devices in the network to reset a FSM of the traffic associated with the endpoint device by:
    assigning a risk level to the endpoint device based on the first set of telemetry data; and
    selecting between a hard FSM reset approach and a soft FSM reset approach, based on the risk level of the endpoint device.

14. The apparatus as in claim 13, wherein the apparatus selects the hard FSM reset approach, and wherein the apparatus instructs the one or more networking devices in the network to reset a FSM of the traffic associated with the endpoint device by:

instructing the one or more networking devices to drop the traffic associated with the endpoint device.

15. The apparatus as in claim 11, wherein the process when executed is further configured to:
identify telemetry data associated with a particular protocol that is missing from the first set of telemetry data, wherein the reset FSM is an FSM for the particular protocol.

16. The apparatus as in claim 15, wherein the apparatus instructs the one or more networking devices in the network to reset a FSM of the traffic associated with the endpoint device by:
instructing the one or more networking devices to send a spoofed control packet for the particular protocol to the endpoint device that causes the reset of the FSM for the particular protocol.

17. The apparatus as in claim 15, wherein the particular protocol comprises at least one of: WiFi, Transmission Control Protocol (TCP), or Stream Control Transmission Protocol (SCTP).

18. The apparatus as in claim 11, wherein the process when executed is further configured to:
select the FSM based on an importance of a traffic telemetry feature associated with the selected FSM to classifications by the classifier.

19. The apparatus as in claim 11, wherein the apparatus instructs the one or more networking devices in the network to reset a FSM of the traffic associated with the endpoint device by:
selecting the one or more networking devices based on their location relative to the endpoint device according to a topology of the network.

20. A tangible, non-transitory, computer-readable medium storing program instructions that cause a device classification service to execute a process comprising:
receiving, at the device classification service, a first set of telemetry data captured by one or more networking devices in a network regarding traffic associated with an endpoint device in the network;
classifying, by the device classification service, the endpoint device as being of an unknown device type, by applying a machine learning-based classifier to the first set of telemetry data;
instructing, by the device classification service, the one or more networking devices in the network to reset a finite state machine (FSM) of the traffic associated with the endpoint device;
receiving, at the device classification service, a second set of telemetry data regarding traffic associated with the endpoint device and captured after reset of the FSM; and
reclassifying, by the device classification service, the endpoint device as being of a particular device type, by applying the machine learning-based classifier to the second set of telemetry data.

* * * * *